Aug. 27, 1963    J. M. MILLER    3,102,257
GAS WARNING DEVICE
Filed July 21, 1958
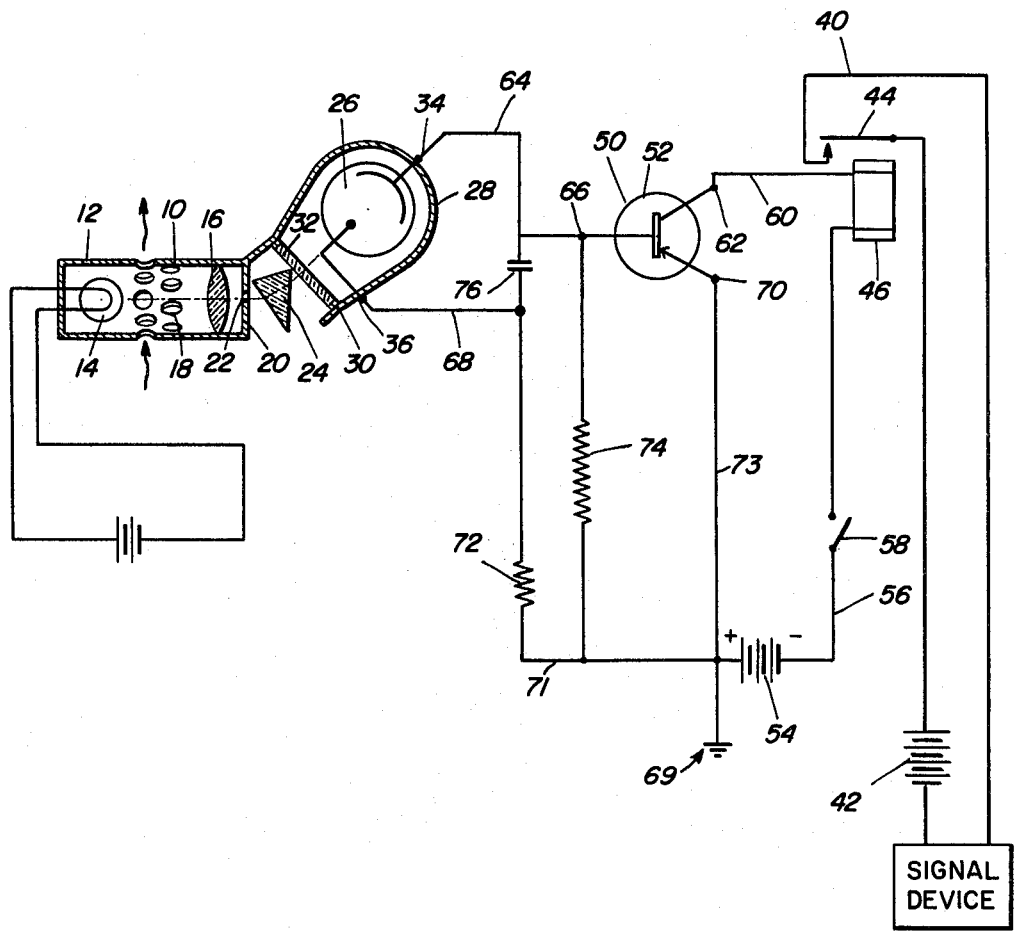
John M. Miller
INVENTOR.
BY *Clarence A. O'Brien*
*and Harvey B. Jacobson*
Attorneys

United States Patent Office 3,102,257
Patented Aug. 27, 1963

3,102,257
GAS WARNING DEVICE
John M. Miller, Blytheville, Ark.
Filed July 21, 1958, Ser. No. 749,816
6 Claims. (Cl. 340—237)

This invention relates to gas detection devices and particularly to a gas detection device for causing a signal to be given in response to the presence of a particular gas.

The gas detection device can be used in many environments. One of these is in or adjacent to motor vehicles or enclosures which ordinarily house motor vehicles, for instance a garage. Therefore the particular gas that is principally dealt with is carbon monoxide gas, although other gases can be detected and caused to trigger the gas warning device in order to yield a signal.

Accordingly, an object of the invention is to provide a warning device that is adapted to operate an external signal circuit when the sensory part of the device is in the presence of a particular gas.

Although there are numerous gas detection devices and systems, this invention very considerably simplifies the structural organization necessary to detect the gas and to have available a current for actuating an external signal circuit. In practicing the invention there is an open gas analysis chamber device and a light sensitive element, for instance a photoelectric cell, between which a selected filter is disposed. The selection of filter is made in accordance with the type of gas that is to be detected. The filter will function to absorb all of the light except that in the portion of the spectrum from the open gas analysis chamber device, which is absorbed by the unwanted gas. An external signal establishing circuit having a source of potential is closed by current from the photoelectric cell after amplification.

Although the amplifier can assume complex proportions, the preference is a tube or transistor, especially the latter connected with a current source, for instance a D.C. battery, the output terminals of the light sensitive element and the external circuit. With a transistor or tube it is suggessed that there be a capacitive coupling between the output terminals of the light sensitive element and an electrical filter for unwanted frequencies also connected therewith. This is part of the control circuit for the transistor, with the transistor becoming conductive in response to current flow at the terminals of the light sensitive element, enabling the D.C. battery to conduct through the transistor and close the signal circuit, for instance by energizing an electromagnetic relay.

The gas detection and warning device is produced in a very small size and at a reasonably low unit cost so that it can be used conveniently either inside a motor vehicle, outside of the motor vehicle or in an area ordinarily containing motor vehicles with their engines in operation. When the carbon monoxide level in, about or adjacent one or more motor vehicles reaches a significant degree, the gas detection and signal device becomes operative to signal in one way or another the toxic condition of the atmosphere.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

The FIGURE is a diagrammatic view showing one form of the invention.

In the drawing there is an open gas analysis chamber device 10 which constitutes a gas sensing part of the gas detection device. The gas analysis chamber device is schematically represented as a housing 12 containing a source 14 of light, for instance a light bulb that is energized by a source of electrical potential. Casing 12 has a collimating lens 16 through which rays from the light source are adapted to pass. A number of apertures 18 are in the side wall of casing 12 and are located at least in part between light source 14 and the collimating lens 16 so that the air adjacent to the gas analysis chamber device can be continually sampled by flowing through the apertures 18. End wall 20 is connected to the casing 12 and has a slit 22 in it through which the collimating light is adapted to pass and impinge on a diffraction grating or prism 24 that splits the light into a spectrum.

A light sensitive electric current producing element 26, for instance a photoelectric cell, is in a light tight housing 28 that can be a part of the casing 12 or attached thereto. Light entrance 30 is in housing 28 and is covered by filter 32 which is selected from a group of filters. The selection is made in accordance with the type of gas that is to be detected. Filter 32 is therefore selected for its ability to absorb all parts of the spectrum except the radiations absorbed by the gas to be detected. The radiations absorbed by the gas are capable of being passed by filter 32 so that it may fall upon photo cell 26 selected or tuned to respond to such radiations causing the photo cell to produce a current at terminals 34 and 36 thereof. The selection of filter 32 is therefore made in accordance with the type of gas that is to be detected, the proper filter absorbing all parts of the spectrum except those absorbed by the gas that is to be detected. A corresponding selection is made for photo cell 26. It is selected from the commercially available photo cells or other light sensitive elements specially designed to operate with the color light passed by the selected filter 32.

Reference is now made to the external or signal circuit 40. This has been illustrated fragmentarily, there being a source of electrical potential, such as battery 42, although an A.C. source could just as well have been selected, and a series connected switch 44 which is part of relay 46. Wiring extends from source 42 to the switch 44, then from switch 44 to a signal device diagrammatically shown and then to ground or to the opposite side of the source 42. The signal device can be a light, bell, buzzer, etc. or can be another electromagnetically operated switch connected to electrical signal devices or even the ignition system of a motor vehicle to interrupt the ignition system, for instance, by grounding it.

Current at terminals 34 and 36 is insufficient, without amplification, to operate relay 46. Therefore an amplifying circuit 50 is connected between terminals 34 and 36 of the light sensitive element and relay 46. The amplifying circuit can use a tube as the amplifier but preferably has transistor 52 as the amplifier because of its small size and low current requirements. This is in keeping with one of the objects of this invention that is to have the gas detection device very small and compact. A small battery 54 can be used in the amplifying circuit 50 with the battery connected to the transistor 52 as shown. Conductor 56 extends from the negative post of the battery to control switch 58 and from that switch to the coil of the electromagnetically operated relay 46. Conductor 60 extends from the opposite end of the same coil to the collector connection point 62 of transistor 52. Hence, manual control switch 58 is in position to control the operation of the gas detection device. Conductor 64 extends from terminal 34 to connection point 66 of the base of the transistor, while conductor 68 extends from light sensitive element terminal 36 through resistor 72 and conductors 71 and 73 to the connection point 70 of the emitter of the transistor. The positive side of battery 54 is attached to ground as at 69 and to conductor 68 on the transistor side of filter resistor 72 that is interposed in conductor 68 between cell terminal 36 and the grounded plus side of battery 54. Filter resistor 74 is shunted across resistor 72 and capacitor 76, the latter connected across conductors 64 and 68.

In operation, the presence of a particular gas, determined by selection of filter 32, is sensed by the existence of lines or bands in the spectrum that are characteristic of the gas. The filter passes only the part of the spectrum that corresponds to and that is absorbed by the gas in question, for instance carbon monoxide, sodium chlorine or some other gas. Filter 32 absorbs all of the spectrum parts except one, and the light thereof stimulates the light sensitive current producing element 26 so that current flows through conductor 64 to the base of the transistor 52 on one side of capacitor 76, and through conductor 68, the electrical filter, and the emitter of transistor 52 causing it to conduct. Therefore, battery source 54 conducts through the emitter, base zone and collector of the transistor, closed manual switch 58 and relay 46. This energizes the relay and closes the external signal circuit 40. Therefore as will be apparent to anyone skilled in the art, opening of signal circuit 40 will occur when the gas to be detected and its filter block the radiations to which the photo cell 26 responds for producing current.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A gas detection and warning device comprising, a source of visible light including radiations of a predetermined wave length exclusively absorbed to a detectable extent by a single gas undetectable by human senses, a gas chamber device having a lens system comprising a collimating element, a slit and means for dispersing the light from said source into radiations of different wave lengths including said predetermined wave length; a photo cell operative to more sensitively respond to changes in intensity of radiations transmitted through said lens system at said predetermined wave length; filter means operatively disposed between said lens system and photocell for completely absorbing only the light radiations of reduced intensity without blocking transmission of radiations of greater intensity at the predetermined wave length; non-discriminating signal circuit means operatively connected to said photo cell for instantaneously rendering a signal in response to a change in intensity of radiations received by the photo cell through the filter means; said gas chamber device further including a gas sampling chamber disposed between said source of visible light and the lens system for effecting a change in the intensity of radiations received by the photo cell through absorption of said radiations by the presence of said single gas.

2. A gas detection and warning device comprising a gas analysis chamber device having a source of visible light radiations of a predetermined wave length and a lens system including a collimating element, a slit and a light dispersing element producing a light spectrum; an optical filter operatively connected with the chamber device to restrictively pass only that part of the light spectrum at said predetermined wave length which is absorbed by a single predetermined gas in the presence of the gas chamber device; a light sensitive element having output terminals and operative to produce an electrical current only in response to said part of the light passed by the filter; means including a switch for controlling a signal; and amplifying means connected with said light sensitive element output terminals and said signal controlling means to actuate said switch when current flows from said light sensitive element.

3. The combination of claim 2 wherein said amplifying means includes an electrical source of energy for said signal, conductors connecting said signal controlling means with the output of said amplifying means, and means including an electrical filter network for connecting said amplifying means with said element terminals.

4. The combination of claim 2 wherein said amplifying means includes an amplifier having two amplifier connection points connected with both of said terminals, a capacitive coupling between said element terminals, a D.C. electrical current source connected with one of said two connection points and a third connection point of said amplifier and adapted to conduct when said amplifier is conductive in response to current output at said light sensitive element terminals, and an external circuit having a relay interposed between said source and said third terminal, and an electrical signal operatively connected with said relay.

5. The combination of claim 2 wherein said amplifying means includes an amplifier having first, second and third connection points, a current source connected with said second and said third connection points for rendering the external circuit operative in response to flow of energizing current therebetween, a conductor connected between said first connection point and one of said terminals, a second conductor connected between said second connection point and the other of said terminals, and a capacitor connected across said conductors to establish a circuit through said conductors and said amplifier in response to current flow at said terminals.

6. The gas detection device of claim 5 wherein said amplifier consists of a transistor with said first connection point at the base and said second connection point at the emitter and said third connection point at the collector thereof.

References Cited in the file of this patent

UNITED STATES PATENTS

| | | |
|---|---|---|
| 2,265,357 | Demarest | Dec. 9, 1941 |
| 2,483,876 | Boyer | Oct. 4, 1949 |
| 2,561,802 | Klug | July 24, 1951 |
| 2,652,742 | Walsh | Sept. 22, 1953 |
| 2,654,845 | Presenz | Oct. 6, 1953 |
| 2,667,102 | MacDougall | Jan. 26, 1954 |
| 2,670,649 | Robinson | Mar. 2, 1954 |
| 2,737,591 | Wright et al. | Mar. 6, 1956 |
| 2,761,067 | Troy | Aug. 28, 1956 |
| 2,768,370 | Maninger | Oct. 23, 1956 |
| 2,771,597 | Freedman | Nov. 20, 1956 |
| 2,787,782 | Rosenblum et al. | Apr. 2, 1957 |
| 2,847,899 | Walsh | Aug. 19, 1958 |

OTHER REFERENCES

Transistor Circuit Handbook by Garner, Jr.: published by Educational Book Publishing Division, Coyne Electrical School, Chicago 12, Ill., copyright 1956, pages 257, 258.